US009112368B1

(12) United States Patent
Sumsion et al.

(10) Patent No.: US 9,112,368 B1
(45) Date of Patent: Aug. 18, 2015

(54) CHARGER WITH STRAP FOR SECURING CORD (71) Applicant: ZAGG Intellectual Property Holding Co., Inc., Salt Lake City, UT (US)

(72) Inventors: Cecily Sumsion, Draper, UT (US); Manuel Carreon, Lehi, UT (US); Mike Jenson, Riverton, UT (US); Joshua Kent Barnes, Roy, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 0 days.

(21) Appl. No.: 14/660,798

(22) Filed: Mar. 17, 2015

(51) Int. Cl.
H01R 13/72 (2006.01)
H02J 7/00 (2006.01)

(52) U.S. Cl.
CPC ............ *H02J 7/0054* (2013.01); *H02J 7/0042* (2013.01)

(58) Field of Classification Search
CPC ...................................... H01R 13/72
USPC ........................... 439/501; 320/111
See application file for complete search history.

(56) References Cited

U.S. PATENT DOCUMENTS

| 3,111,753 | A | * | 11/1963 | Seibold | 30/34.05 |
| 4,940,427 | A | * | 7/1990 | Pearson | 439/501 |
| 5,720,628 | A | * | 2/1998 | Usui et al. | 439/502 |
| 5,819,894 | A | * | 10/1998 | Okamoto | 191/12.4 |
| 5,923,146 | A | * | 7/1999 | Martensson | 320/111 |
| 6,427,290 | B1 | * | 8/2002 | Liu | 24/16 R |
| 6,433,274 | B1 | * | 8/2002 | Doss et al. | 174/50 |
| 6,536,699 | B2 | * | 3/2003 | Glass | 242/400.1 |
| 7,121,877 | B2 | * | 10/2006 | Lin | 439/502 |
| 7,151,356 | B1 | * | 12/2006 | Chen | 320/107 |
| 7,175,474 | B1 | * | 2/2007 | Chang et al. | 439/501 |
| 7,677,920 | B2 | * | 3/2010 | Huang et al. | 439/501 |
| 7,746,029 | B2 | * | 6/2010 | Toya | 320/107 |
| 7,871,291 | B2 | * | 1/2011 | Tracy et al. | 439/501 |
| 8,147,271 | B2 | * | 4/2012 | Xie | 439/502 |
| 8,274,257 | B2 | * | 9/2012 | Liu | 320/113 |
| 8,794,996 | B1 | * | 8/2014 | Matsuoka | 439/501 |
| 8,802,991 | B1 | * | 8/2014 | Hua et al. | 174/135 |
| 8,888,524 | B2 | * | 11/2014 | Martin et al. | 439/502 |

OTHER PUBLICATIONS

Portable Dual Tablet/ Phone Charger w/ Flashlight; accessed Mar. 13, 2015; 3 pages. https://www.corporatetravelsafety.com/catalog/portable-dual-tablet-phone-charger-w-flashlight.html.
Elastic Non-slip Knitted Silicone Nylon Tape; accessed Mar. 13, 2015; 8 pages. http://www.alibaba.com/product-detail/Elastic-Non-slip-Knitted-Silicone-Nylon_60075690516.html.
Silly Tube Power Banks; accessed Mar. 13, 2015; 3 pages. http://www.totalmerchandise.co.uk/products/details/Silly-Tube-Power-Banks.

* cited by examiner

*Primary Examiner* — Neil Abrams
(74) *Attorney, Agent, or Firm* — Thorpe North & Western, LLP (57) ABSTRACT

A supplemental, rechargeable battery device has a housing containing a battery and a cord receiving portion circumscribing the housing. A button is coupled directly to and extending directly from a lateral side of the housing. A flexible strap is coupled to the housing and has a fixed end fixedly attached to a distal end of the housing, and an opposite free end removably couplable to the button.

21 Claims, 8 Drawing Sheets

CHARGER WITH STRAP FOR SECURING CORD

BACKGROUND

1. Field of the Invention

The present invention relates generally to supplemental, rechargeable battery or charger with a strap for securing an associated power cord.

2. Related Art

Cellular phones and tables are increasing in popularity and use. Such phones and tablets have internal batteries that can be charged with a charger that plugs into an electrical outlet. Such phones and tablets, however, can expire prematurely. Supplemental batteries have been developed that allow the internal batteries of the phone or tablet to be charged by the supplemental battery using a cord. Such cords can become tangled and unmanageable. In addition, various devices have different power port configurations; and keeping track of different cords can be difficult.

SUMMARY OF THE INVENTION

It has been recognized that it would be advantageous to develop a supplemental, rechargeable battery or charger that can manage the associated cord(s).

The invention provides a supplemental, rechargeable battery device configured to provide a supplemental charge or power to a portable, hand-held electronic device with a power cord having opposite free ends each with one of first and second electrical couplings. The battery device comprises a housing containing a battery. The battery device has at least one power inlet port coupled to the battery, and configured to receive a power connection to charge the battery, and at least one power outlet port coupled to the battery, and configured to receive the power connection or another power connection to charge the portable, hand-held electronic device with the battery. The housing has an elongated shape with a length greater than a width and a depth of the housing. The housing has a proximal end and a distal end. The housing has a cord receiving portion circumscribing the housing at the distal end of the housing. A button is coupled directly to and extends directly from a lateral side of the housing at a location intermediate the proximal and distal ends of the housing, and adjacent the cord receiving portion. The button has an enlarged head spaced-apart from the housing, and a narrower neck extending between the enlarged head and the housing. A flexible strap is coupled to the housing, and has a fixed end fixedly attached to the distal end of the housing. The fixed end of the strap and the button are disposed on opposite ends of the cord receiving portion of the housing. The flexible strap has an opposite free end removably couplable to the button. The flexible strap has a length extending from the fixed end, across the cord receiving portion to the free end at the button. The free end of the strap has an aperture removably receiving the button therethrough. The strap has at least two configurations, including: 1) a storage configuration in which the button is received in the aperture of the free end of the strap; and 2) a use configuration in which with the button is removed from the aperture of the free end of the strap.

In accordance with a more detailed aspect of the invention, the battery device can further comprise a ring coupled to the fixed end of the strap. The free end of the strap can have a width at the aperture greater than a width of an opening in the ring. The free end of the strap can be removably received through the opening of the ring in the use configuration. The power cord can be wrapped around the cord receiving portion of the housing and held in place by the strap extending over the power cord with a portion of the power cord between the strap and the cord receiving portion of the housing in the storage configuration. At least one of the first and second electrical couplings can be disposed in at least one of the at least one power inlet port or the at least one power outlet port, and at least some of the power cord can be un-wrapped from the cord receiving portion of the housing, in the use configuration In addition, the invention provides a method for selectively storing a power cord having opposite free ends each with one of first and second electrical couplings, the method comprises wrapping the power cord in a helical loop around a cord receiving portion of an elongated housing containing a battery. The housing has at least one power inlet port coupled to the battery and configured to receive a power connection to charge the battery. The housing has at least one power outlet port coupled to the battery and configured to receive the power connection or another power connection to charge the portable, hand-held electronic device with the battery. The housing has an elongated shape with a length greater than a width and a depth of the housing. The housing has a proximal end and a distal end. The cord receiving portion circumscribes the housing at the distal end of the housing. The housing has a button coupled directly to and extending directly from the housing at a location intermediate the proximal and distal ends of the housing, and adjacent the cord receiving portion. The button has an enlarged head spaced-apart from the housing, and a narrower neck extending between the housing and the enlarged head. The method further comprises extending a strap over the power cord wrapped around the housing. The flexible strap has a fixed end fixedly attached to the distal end of the housing and an opposite free end. The method further comprises pressing an aperture in the free end of the strap over the button, securing the power cord to the housing. The flexible strap has a length extending from the fixed end, across the cord receiving portion and power cord to the free end at the button. The method further comprises pulling the free end of the strap from the button; drawing the strap away from the power cord; and inserting the free end of the strap through an opening in a ring. The ring is coupled to the fixed end of the strap. The method further comprises unwrapping at least a portion of the power cord from the cord receiving portion of the housing.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "portable, hand-held electronic device" is used herein to refer to a computer or cellular phone with a display screen and a rechargeable battery, and that is portable and hand-held. The display screen can be a touch screen that can receive input by touch such as finger swipes, and/or can have a virtual keyboard. The portable, hand-held electronic device can have memory and a processor with software running thereon. The portable, hand-held electronic device can have cellular, WiFi and/or Bluetooth connectivity. Thus, the portable, hand-held electronic device can provide internet browsing, game playing, movie and picture display, e-book display, etc. In addition, the portable, hand-held electronic device can include a digital camera. Furthermore, the portable, hand-held electronic device can have an inlet port for making an electrical connection or coupling for data and/or power. Examples of portable, hand-held electronic devices include cellular or cell phones, tablets or tablet computers, phablets, digital music players, etc. In addition, the term portable, hand-held electronic device is also used herein to refer to other electronic devices with rechargeable batteries that can be charged, including for example, wireless headphones, smart watches, fitness bands or other wearables, wireless speakers, etc.

The term "electrical coupling" is used to refer to a plug or socket coupling on a cord and mates with a respective socket or plug. For example, the electrical couplings can be standard plugs, such as USB (type A) or mini-USB plugs or micro-USB plugs. The electrical couplings of the cord can be the same, or different. For example, one of the electrical couplings can be a USB plug (e.g. USB type A) while the other electrical coupling can be a mini-USB plug, or a proprietary plug configuration.

The terms "power outlet port" and "power inlet port" refer to electrical sockets coupled to a battery to deliver or receive, respectively, power. The power outlet port can receive an electrical coupling or plug of a cord that is coupled to a power source or transformer to charge the battery. The power inlet port can receive an electrical coupling or plug of a cord that is coupled to a socket of a portable, hand-held electronic device to power or charge a batter of the device.

Description

As illustrated in FIGS. 1-10, a supplemental, rechargeable battery device and system, indicated generally at 10, in an example implementation in accordance with the invention is shown for powering and/or charging a portable, hand-held electronic device 14, such as a cellular phone. The portable, hand-held electronic device 14 can have a battery 18 electrically coupled to a power inlet port 22. The supplemental, rechargeable battery device 10 can power or charge the portable, hand-held electronic device 14 with a power cord 26. The supplemental, rechargeable battery device 10 can be configured to manage the power cord 26, and can carry and store the power cord, to resist tangling and loss of the power cord. In addition, the supplemental, rechargeable battery device 10 can keep the power cord readily available for use.

The power cord 26 can have opposite free ends, each with one of first and second electrical couplings 30 and 34. For example, the first and second electrical coupling can comprise a USB plug 30 (e.g. USB type A) and a mini-USB plug 34. In one aspect, at least one of the first and second electrical couplings can be a USB type A plug. The USB type A plug can be utilized by a standard wall charger or transformer to charge the supplemental, rechargeable battery device, and can be utilized by the supplemental, rechargeable battery device to charge the portable, hand-held electronic device, as described in greater detail below.

Figure 8:
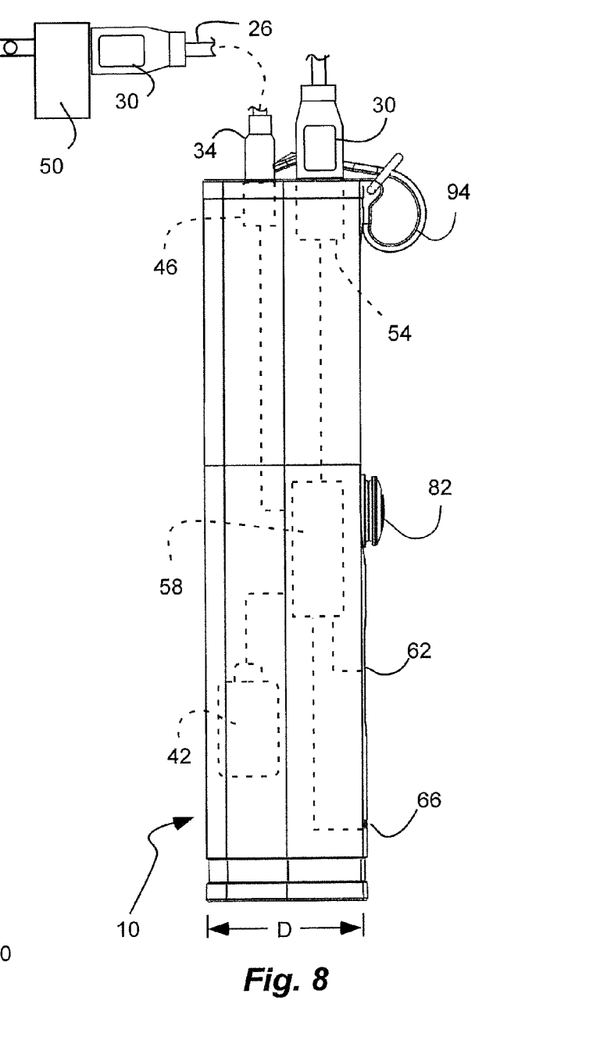
FIG. 8 is a side view of the supplemental, rechargeable battery device of FIG. 1, shown with the strap in the use configuration, and the power cord removed.

The supplemental, rechargeable battery device 10 can comprise a housing 38 containing a rechargeable battery 42 (FIG. 8). The housing 38 can have at least one power inlet port 46 coupled to the battery, and configured to receive a power connection to charge the battery 42. In one aspect, the power inlet port 46 can be a mini-USB port, and the power connection can be a mini-USB plug, such as the mini-USB plug 34 of the power cord 26. In one aspect, the power cord 26 can be used to charge the supplemental, rechargeable battery device 10, or rechargeable battery 42 thereof, with the first electrical coupling 30 or USB type A plug connected to a wall charger or transformer 50, and the second electrical coupling 34 or mini-USB plug connected to the power inlet port 46 or mini-USB port of the housing. In addition, the housing 38 can have at least one power outlet port 54 coupled to the rechargeable battery 42 and configured to receive the power connection or another power connection to charge the portable, hand-held electronic device 14, or battery 18 thereof, with the rechargeable battery 42. In one aspect, the power outlet port 54 can be a USB type A port, and the power connection can be a USB type A plug, such as the USB type A plug 30 of the power cord 26. (In another aspect, the another power connection can be a USB type A plug of another power cord having a different or proprietary electrical coupling on the opposite end.) In one aspect, the power cord 26 can be used to charge the portable, hand-held electronic device 14, or battery 18 thereof, with the first electrical coupling 30 or USB type A plug connected to the power outlet port 54 or USB type A port of the housing, and the second electrical coupling 34 or mini-USB plug connected to the power inlet port 22 (or mini-USB port) of the portable, hand-held electronic device 14. In addition, the housing can contain control electronics 58 to control charging and discharging of the rechargeable battery 42. Furthermore, the housing can have one or more switches 62 coupled to the control electronics to control discharge of the battery 42, and one or more indicator lights 66 coupled to the control electronics to indicate the charge level of the battery 42. In another aspect, the hosing can have a light (such as a flash light) and a power switch to activate the light.

Figure 7:
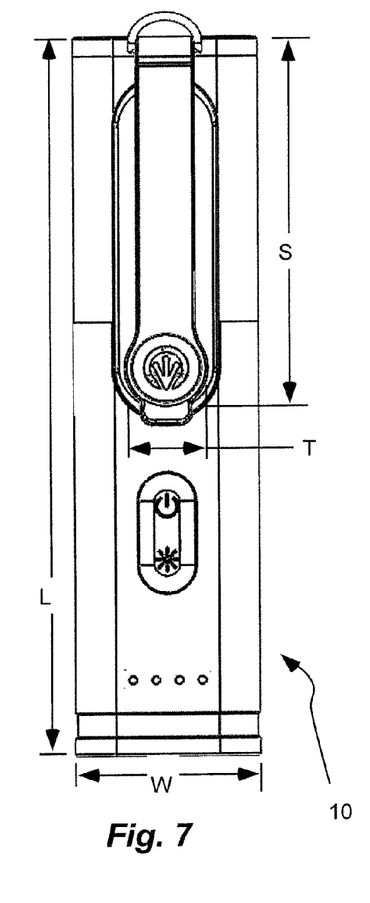
FIG. 7 is a front view of the supplemental, rechargeable battery device of FIG. 1, shown with the strap in the storage configuration, and the power cord removed.

The housing 38 can have an elongated shape with a length L greater than a width W and a depth D (or a diameter) of the housing, as shown in FIGS. 7 and 8. The housing having a proximal end 70 and a distal end 74. The ends of the housing can be flat so that the housing can rest upright, in a vertical orientation, on a support surface. In addition, the housing 38 can have a cord receiving portion 78 circumscribing the housing at the distal end 74 of the housing. In one aspect, the cord receiving portion 78 can receive the power cord wrapped or coiled around the housing. In another aspect, the cord receiving portion can receive the power cord wrapped or coiled about itself in a loop, and disposed and held against the housing or cord receiving portion thereof. The cord receiving portion 78 can be located at one end or half of the housing to resist interference with other functions, such as switches, indicator lights, etc., associated with the housing. In addition, another end or half of the housing can be utilized to hold the housing without interfering with the power cord.

The supplemental, rechargeable battery device 10 or the housing 38 has a button 82 coupled directly to and extending directly from a lateral side of the housing. The button 82 can be located intermediate the proximal and distal ends 70 and 74 of the housing, and can be located adjacent the cord receiving portion 78. The button 82 can have an enlarged head 86 spaced-apart from the housing 38, and a narrower neck 90 extending between the enlarged head 86 and the housing 38. In one aspect, the button 82 can be located substantially at a midpoint along the length L of the housing. The cord receiving portion 78 of the housing can be defined on substantially one half of the housing, between the button and the distal end.

In addition, the supplemental, rechargeable battery device 10 or the housing 38 has a flexible strap 94 coupled to the housing. The strap 94 can have a fixed end 98 fixedly attached to the distal end 74 of the housing 38. The fixed end 98 of the strap 94 and the button 82 can be disposed on opposite ends of the cord receiving portion 78 of the housing 38. In addition, the flexible strap 94 can have an opposite free end 102 removably couplable to the button 82. The flexible strap 94 has a length S extending from the fixed end 98, across the cord receiving portion 78 to the free end 102 at the button 82. The free end 102 of the strap 94 can have an aperture 106 removably receiving the button therethrough. In one aspect, at least the free end 98 of the strap 94, or the portion around the aperture 106, can be elastic and stretchable so that the aperture 106 of the free end of the strap is capable of expanding to stretch over the enlarged head 86 of the button 82, and contract on the narrower neck 90 of the button. The aperture 106 of the free end 102 of the strap 94 has a size or diameter when relaxed substantially the same as a size or diameter of the narrower neck 90 of the button.82. Thus, the strap can secure the power cord 26 wrapped around the cord receiving portion of the body to the body in a storage configuration, as shown in FIGS. 1 and 5.

In one aspect, the strap 94 can also have a ring 110 coupled to the fixed end 98 of the strap. The free end 102 of the strap 94 can have a width T at the aperture 106 greater than a width or diameter of an opening in the ring 110. In one aspect, the fixed end 98 of the strap can have a bore therethrough to receive the ring. The fixed end 98 of the strap can have an increased thickness with respect to the remainder of the strap to accommodate the bore and the ring. The ring can be formed of metal or plastic, while the strap can be formed of an elastic material.

Figure 1:
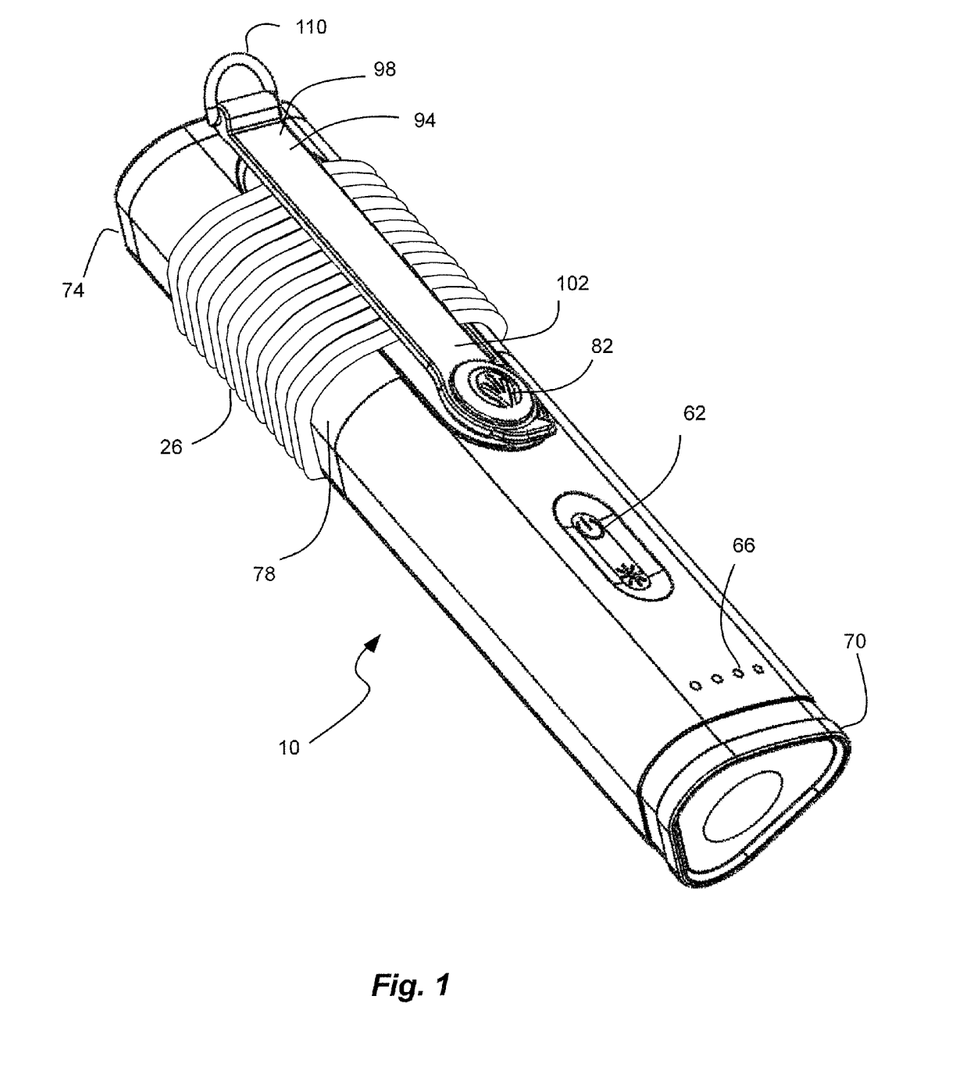
FIG. 1 is a perspective view of a supplemental, rechargeable battery device in accordance with an embodiment of the present invention, shown with a strap and a power cord wrapped around a cord receiving portion thereof in a storage configuration.
Figure 2:
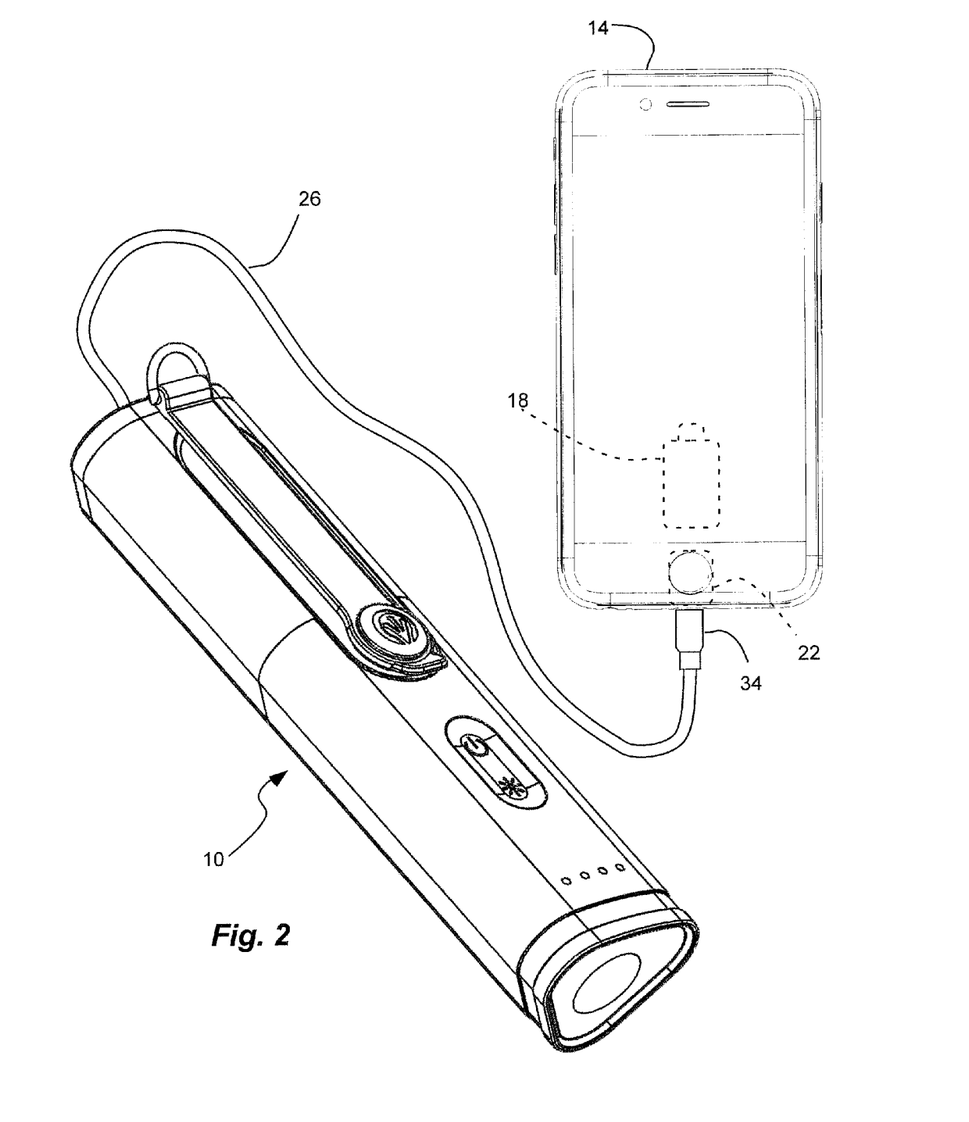
FIG. 2 is a perspective view of the supplemental, rechargeable battery device of FIG. 1, shown with the strap in the storage configuration, and with the power cord removed, and shown powering or charging a portable, hand-held electronic device.
Figure 3:
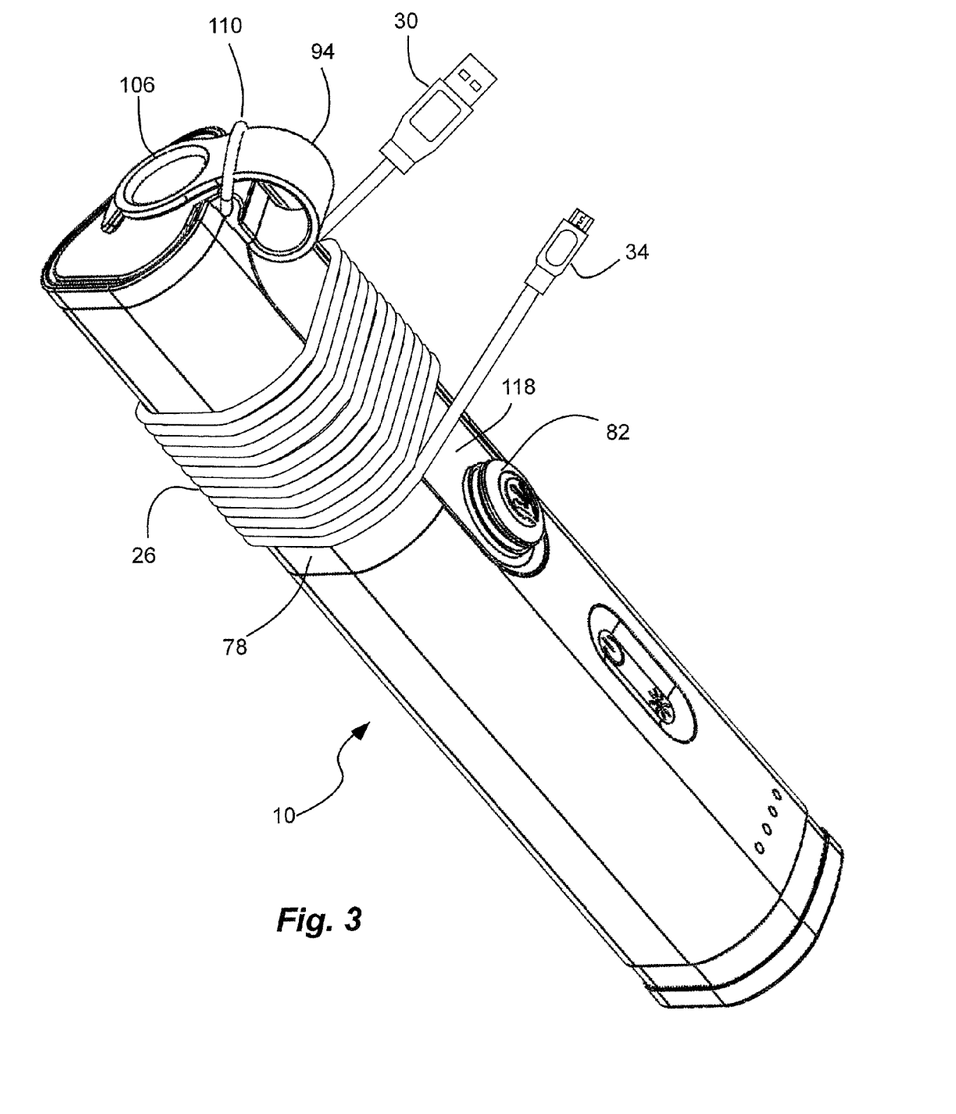
FIG. 3 is a perspective view of the supplemental, rechargeable battery device of FIG. 1, shown with the strap and the power cord in a use configuration.
Figure 4:
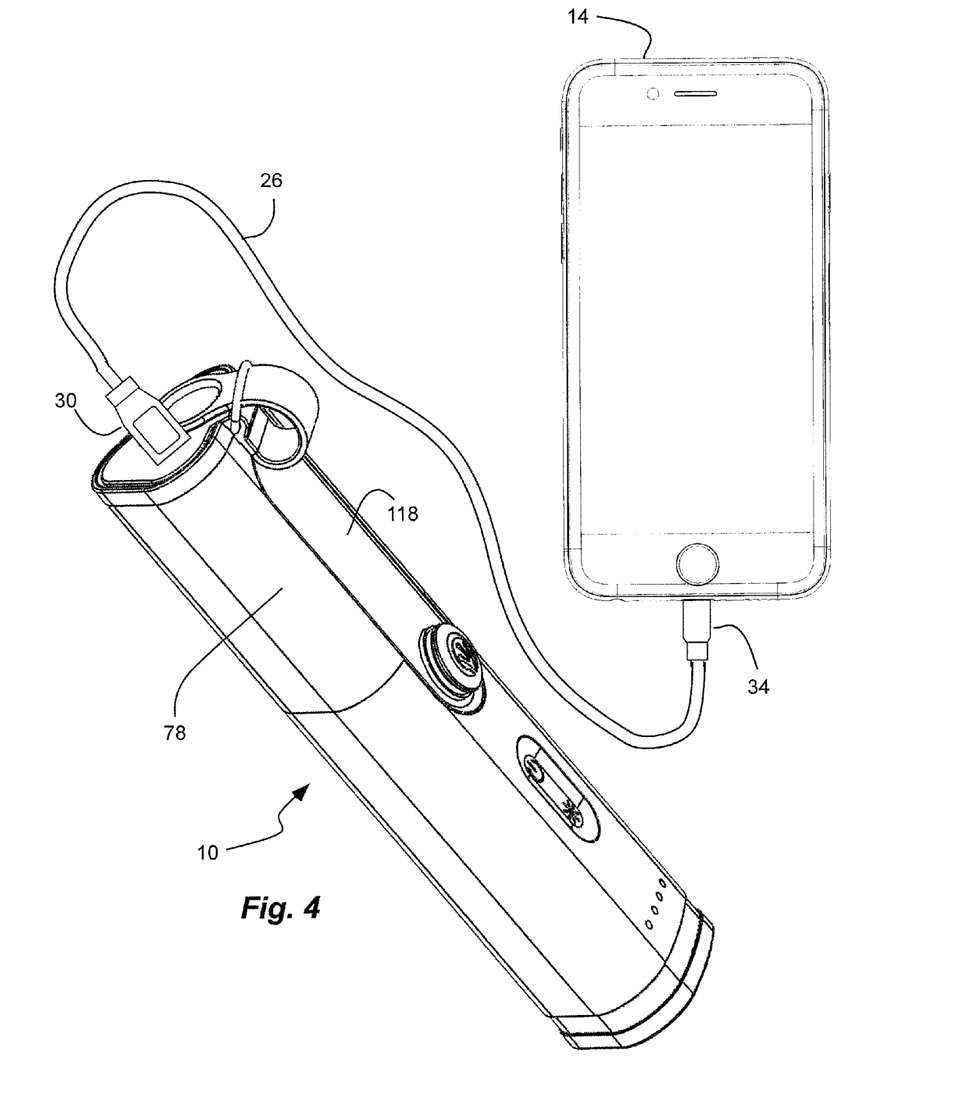
FIG. 4 is a perspective view of the supplemental, rechargeable battery device of FIG. 1, shown with the strap in the use configuration, and with the power cord removed, and shown powering or charging the portable, hand-held electronic device.
Figure 5:
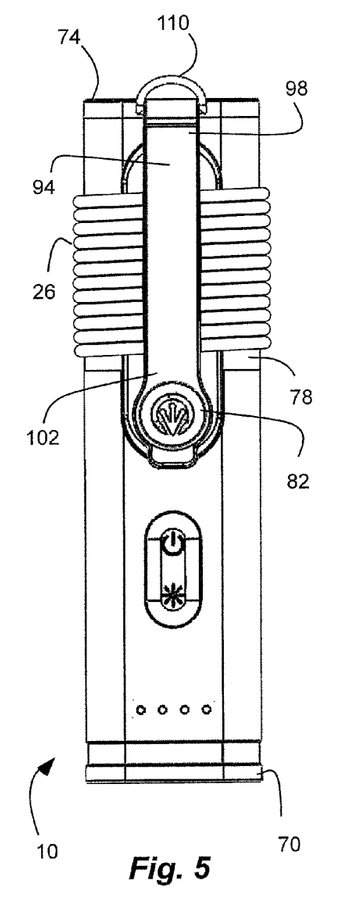
FIG. 5 is a front view of the supplemental, rechargeable battery device of FIG. 1, shown with the strap and the power cord in the storage configuration.

The strap 94 and the power cord 26 can have at least two configurations, including: 1) a storage configuration, as shown in FIGS. 1 and 5, and 2) a use configuration, as shown in FIGS. 2-4 and 6. In the storage configuration, the power cord 26 can be wrapped around the cord receiving portion 78 of the housing 38, and held in place by the strap 94 extending over the power cord with a portion of the power cord between the strap and the cord receiving portion of the housing. In addition, the button 82 can be received in the aperture 106 of the free end 102 of the strap 94. In another aspect, the power cord can be wrapped about itself to form a coil; and the coil can be disposed against the cord receiving portion of the housing and held in place by the strap extending over the coil. In the use configuration, at least one of the first and second electrical couplings 30 or 34 of the power cord 26 is disposed in at least one of the at least one power inlet port 46 or the at least one power outlet port 54. In addition, the button 82 can be removed from the aperture 106 of the free end 102 of the strap 94. Furthermore, at least some of the power cord is un-wrapped from the cord receiving portion 78 of the housing 38, and the free end 102 of the strap is removably received through the opening of the ring 110. In one aspect, inserting the free end 102 of the strap through the opening of the ring 110 forms a loop 116 out of the strap that can be used to hang the supplemental, rechargeable battery device and system or housing from another object in a suspended fashion. Thus, the strap can be used to secure the cord or to hand the housing. In another aspect, the ring 110 can be used to suspend the supplemental, rechargeable battery device and system or housing.

Figure 9:
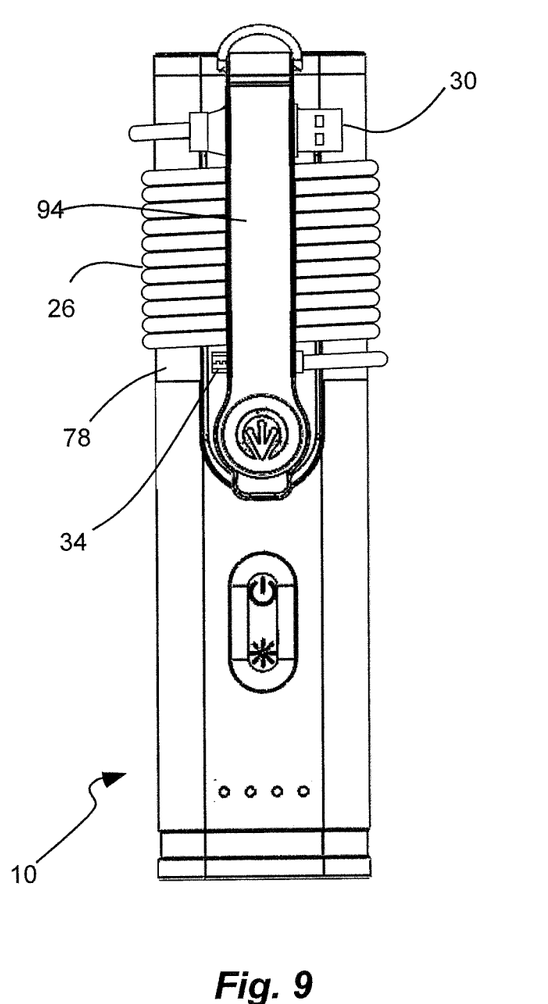
FIG. 9 is a front view of the supplemental, rechargeable battery device of FIG. 1, shown with the strap and the power cord in the storage configuration.

In one aspect, the housing 38 can have a cross-sectional shape with a flat portion 118 opposing the strap 94 when the strap is in the storage configuration. In addition, the first and second electrical couplings 30 and 34 of the power cord 26 are held between the strap 94 and the housing 38 when the strap is in the storage configuration, as shown in FIG. 9.

Figure 10:
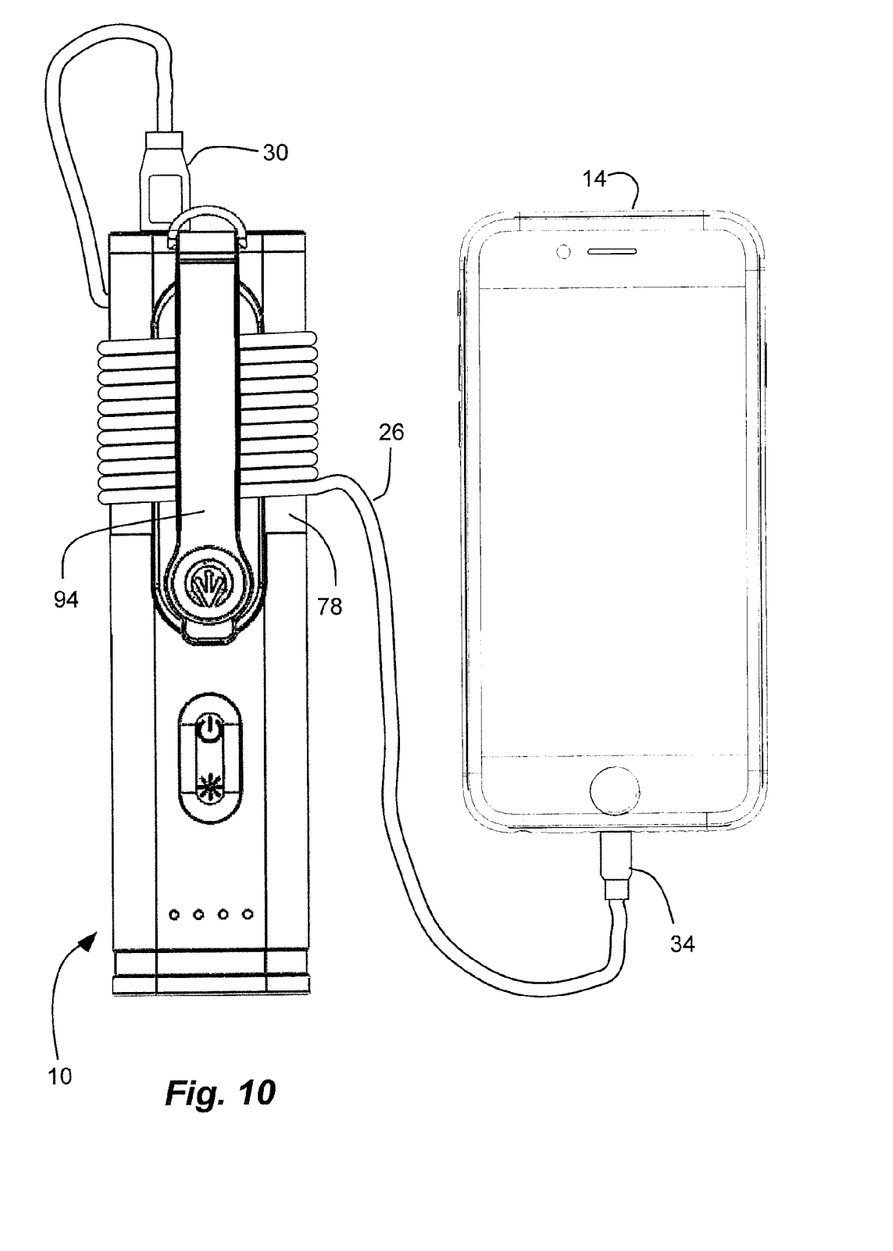
FIG. 10 is a front view the supplemental, rechargeable battery device of FIG. 1, shown with the strap in the storage configuration, and with the power cord partially removed and partially wrapped around the housing, and shown powering or charging a portable, hand-held electronic device.

Referring to FIG. 10, the power cord 26 can be partially wrapped around the cord receiving portion 78 of the housing 38, and partially removed. The strap 94 can be disposed over the portion of the power cord wrapped around the housing. Thus, the power cord can be managed while being used to charge the portable, hand-held electronic device 14.

In addition, more than one cord can be wrapped around the cord receiving portion 78 of the housing 38. For example, two separate and distinct cords can be wrapped around the housing. One cord can power or charge the supplemental, rechargeable battery device 10 while another cord can power or charge the portable, hand-held electronic device 14. Furthermore, one cord can be wrapped around the cord receiving portion 78 of the housing 38 and secured by the strap, while the other cord is in use. Thus, one cord can be in the storage configuration, while the other cord is in the use configuration.

Figure 6:
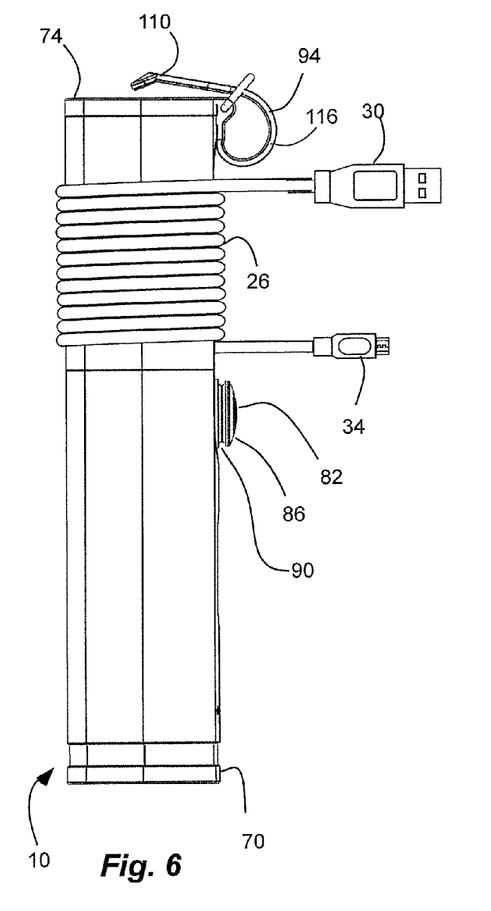
FIG. 6 is a side view of the supplemental, rechargeable battery device of FIG. 1, shown with the strap and the power cord in the use configuration.

A method for using the supplemental, rechargeable battery device 10 described above, and for selectively storing the power cord 26 with the supplemental, rechargeable battery device 10, comprises: wrapping the power cord 26 in a helical loop around the cord receiving portion 78 of the housing 38 (as shown in FIGS. 1, 3, 5 and 6); extending the strap 94 over the power cord 26 wrapped around the housing (as shown in FIGS. 1 and 5); pressing the aperture 106 in the free end 102 of the strap 94 over the button 82, securing the power cord 26 to the housing 38 (as shown in FIGS. 1 and 5); pulling the free end 102 of the strap 94 from the button 82; drawing the strap 94 away from the power cord 26 (as shown in FIGS. 3 and 4);

inserting the free end 102 of the strap 94 through the opening in the ring 110 (as shown in FIGS. 3 and 4); and unwrapping at least a portion of the power cord 26 from the cord receiving portion 78 of the housing 38 (as shown in FIGS. 3 and 6).

In one aspect, the method can further comprise: plugging the first electrical coupling of 30 the power cord 26 into the at least one power outlet port 54 (as shown in FIGS. 2 and 8); and plugging the second electrical coupling 34 of the power cord 26 into a port 22 of the portable, hand-held electronic device 14 to power and/or charge the portable, hand-held electronic device, as shown in FIGS. 2 and 8.

In another aspect, the method can further comprise: plugging the first electrical coupling 30 of the power cord 26 into a port of a power source 50, as shown in FIG. 8; and plugging the second electrical coupling 34 of the power cord 26 into the at least one power inlet port 46 of the housing to charge the battery 42.

In another aspect, the method can further comprise: disposing the first and second electrical couplings 30 and 34 of the power cord 26 between the strap 94 and the housing 38, as shown in FIG. 9.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A supplemental, rechargeable battery device configured to provide a supplemental charge or power to a portable, hand-held electronic device with a power cord having opposite free ends each with one of first and second electrical couplings, the battery device comprising:
   a) a housing containing a battery, and having at least one power inlet port coupled to the battery and configured to receive a power connection to charge the battery, and at least one power outlet port coupled to the battery and configured to receive the power connection or another power connection to charge the portable, hand-held electronic device with the battery;
   b) the housing having an elongated shape with a length greater than a width and a depth of the housing, the housing having a proximal end and a distal end;
   c) the housing having a cord receiving portion circumscribing the housing at the distal end of the housing;
   d) a button coupled directly to and extending directly from a lateral side of the housing at a location intermediate the proximal and distal ends of the housing and adjacent the cord receiving portion, the button having an enlarged head spaced-apart from the housing, and a narrower neck extending between the enlarged head and the housing;
   e) a flexible strap coupled to the housing and having a fixed end fixedly attached to the distal end of the housing, with the fixed end of the strap and the button disposed on opposite ends of the cord receiving portion of the housing, and the flexible strap having an opposite free end removably couplable to the button, the flexible strap having a length extending from the fixed end, across the cord receiving portion to the free end at the button;
   f) the free end of the strap having an aperture removably receiving the button therethrough; and
   g) the strap having at least two configurations, including:
      i) a storage configuration in which the button is received in the aperture of the free end of the strap; and
      ii) a use configuration in which with the button is removed from the aperture of the free end of the strap.

2. The device in accordance with claim 1, further comprising:
   a) a ring coupled to the fixed end of the strap;
   b) the free end of the strap having a width at the aperture greater than a width of an opening in the ring;
   c) the free end of the strap being removably received through the opening of the ring in the use configuration.

3. The device in accordance with claim 1, further comprising the power cord; wherein the power cord is wrapped around the cord receiving portion of the housing and held in place by the strap extending over the power cord with a portion of the power cord between the strap and the cord receiving portion of the housing in the storage configuration; wherein at least one of the first and second electrical couplings is disposed in at least one of the at least one power inlet port or the at least one power outlet port, and at least some of the power cord is un-wrapped from the cord receiving portion of the housing, in the use configuration.

4. The device in accordance with claim 1, wherein the button is located substantially at a midpoint along the length of the housing, and defining the cord receiving portion on substantially one half of the housing.

5. The device in accordance with claim 1, wherein the housing has a cross-sectional shape with a flat portion opposing the strap when the strap is in the storage configuration.

6. The device in accordance with claim 1, wherein the first and second electrical couplings of the power cord are held between the strap and the housing when the strap is in the storage configuration.

7. The device in accordance with claim 1, further comprising:
   a) at least the free end of the strap being elastic and stretchable so that the aperture of the free end of the strap is capable of expanding to stretch over the enlarged head of the button, and contract on the narrower neck of the button; and
   b) the aperture of the free end of the strap having a size when relaxed substantially the same as a size of the narrower neck of the button.

8. A method for selectively storing the power cord with the supplemental, rechargeable battery device of claim 1, the method comprising:
   a) wrapping the power cord in a helical loop around the cord receiving portion of the housing;
   b) extending the strap over the power cord wrapped around the housing;
   c) pressing the aperture in the free end of the strap over the button, securing the power cord to the housing;
   d) pulling the free end of the strap from the button; and
   e) drawing the strap away from the power cord.

9. The method in accordance with claim 8, further comprising:
   f) inserting the free end of the strap through an opening in a ring coupled to the fixed end of the strap; and
   g) unwrapping at least a portion of the power cord from the cord receiving portion of the housing.

10. The method in accordance with claim 8, further comprising:
   a) plugging the first electrical coupling of the power cord into the at least one power outlet port; and
   b) plugging the second electrical coupling of the power cord into a port of the portable, hand-held electronic device to power and/or charge the portable, hand-held electronic device.

11. The method in accordance with claim 8, further comprising:
 a) plugging the first electrical coupling of the power cord into a port of a power source; and
 b) plugging the second electrical coupling of the power cord into the at least one power inlet port of the housing to charge the battery.

12. A supplemental, rechargeable battery device in combination with a portable, hand-held electronic device and a power cord having opposite free ends each with one of first and second electrical couplings, the battery device comprising:
 a) a housing containing a battery, and having at least one power inlet port coupled to the battery and configured to receive a power connection to charge the battery, and at least one power outlet port coupled to the battery and configured to receive the power connection or another power connection to charge the portable, hand-held electronic device with the battery;
 b) the housing having an elongated shape with a length greater than a width and a depth of the housing, the housing having a proximal end and a distal end;
 c) the housing having a cord receiving portion circumscribing the housing at the distal end of the housing;
 d) a button coupled directly to and extending directly from a lateral side of the housing at a location intermediate the proximal and distal ends of the housing and adjacent the cord receiving portion, the button having an enlarged head spaced-apart from the housing, and a narrower neck extending between the enlarged head and the housing;
 e) a flexible strap coupled to the housing and having a fixed end fixedly attached to the distal end of the housing, with the fixed end of the strap and the button disposed on opposite ends of the cord receiving portion of the housing, and the flexible strap having an opposite free end removably couplable to the button, the flexible strap having a length extending from the fixed end, across the cord receiving portion to the free end at the button;
 f) the free end of the strap having an aperture removably receiving the button therethrough;
 g) a ring coupled to the fixed end of the strap;
 h) the free end of the strap having a width at the aperture greater than a width of an opening in the ring;
 i) the strap and the power cord having at least two configurations, including:
  i) a storage configuration in which the power cord is wrapped around the cord receiving portion of the housing and held in place by the strap extending over the power cord with a portion of the power cord between the strap and the cord receiving portion of the housing, and the button received in the aperture of the free end of the strap; and
  ii) a use configuration in which at least one of the first and second electrical couplings is disposed in at least one of the at least one power inlet port or the at least one power outlet port with the button removed from the aperture of the free end of the strap, and at least some of the power cord is un-wrapped from the cord receiving portion of the housing, and the free end of the strap is removably received through the opening of the ring.

13. The combination in accordance with claim 12, wherein the button is located substantially at a midpoint along the length of the housing, and defining the cord receiving portion on substantially one half of the housing.

14. The combination in accordance with claim 12, wherein the housing has a cross-sectional shape with a flat portion opposing the strap when the strap is in the storage configuration.

15. The combination in accordance with claim 12, wherein the first and second electrical couplings of the power cord are held between the strap and the housing when the strap is in the storage configuration.

16. The combination in accordance with claim 12, further comprising:
 a) at least the free end of the strap being elastic and stretchable so that the aperture of the free end of the strap is capable of expanding to stretch over the enlarged head of the button, and contract on the narrower neck of the button; and
 b) the aperture of the free end of the strap having a size when relaxed substantially the same as a size of the narrower neck of the button.

17. A method for selectively storing the power cord with the supplemental, rechargeable battery device of claim 12, the method comprising:
 a) wrapping the power cord in a helical loop around the cord receiving portion of the housing;
 b) extending the strap over the power cord wrapped around the housing;
 c) pressing the aperture in the free end of the strap over the button, securing the power cord to the housing;
 d) pulling the free end of the strap from the button;
 e) drawing the strap away from the power cord;
 f) inserting the free end of the strap through the opening in the ring; and
 g) unwrapping at least a portion of the power cord from the cord receiving portion of the housing.

18. The method in accordance with claim 17, further comprising:
 a) plugging the first electrical coupling of the power cord into the at least one power outlet port; and
 b) plugging the second electrical coupling of the power cord into a port of the portable, hand-held electronic device to power and/or charge the portable, hand-held electronic device.

19. The method in accordance with claim 17, further comprising:
 a) plugging the first electrical coupling of the power cord into a port of a power source; and
 b) plugging the second electrical coupling of the power cord into the at least one power inlet port of the housing to charge the battery.

20. A method for selectively storing a power cord having opposite free ends each with one of first and second electrical couplings, the method comprising:
 a) wrapping the power cord in a helical loop around a cord receiving portion of an elongated housing containing a battery, and having at least one power inlet port coupled to the battery and configured to receive a power connection to charge the battery, and at least one power outlet port coupled to the battery and configured to receive the power connection or another power connection to charge the portable, hand-held electronic device with the battery, the housing having an elongated shape with a length greater than a width and a depth of the housing, the housing having a proximal end and a distal end, the cord receiving portion circumscribing the housing at the distal end of the housing, the housing having a button coupled directly to and extending directly from the housing at a location intermediate the proximal and distal ends of the housing and adjacent the cord receiving portion, the button having an enlarged head spaced-apart from the housing, and a narrower neck extending between the housing and the enlarged head;

b) extending a strap over the power cord wrapped around the housing, the flexible strap having a fixed end fixedly attached to the distal end of the housing and an opposite free end;

c) pressing an aperture in the free end of the strap over the button, securing the power cord to the housing, the flexible strap having a length extending from the fixed end, across the cord receiving portion and power cord to the free end at the button;

d) pulling the free end of the strap from the button;

e) drawing the strap away from the power cord;

f) inserting the free end of the strap through an opening in a ring, the ring coupled to the fixed end of the strap; and g) unwrapping at least a portion of the power cord from the cord receiving portion of the housing.

21. The method in accordance with claim 20, further comprising:

disposing the first and second electrical couplings of the power cord between the strap and the housing.

\* \* \* \* \*